United States Patent [19]

Shaw et al.

[11] Patent Number: 5,236,492
[45] Date of Patent: Aug. 17, 1993

[54] RECOVERY OF PRECIOUS METAL VALUES FROM REFRACTORY ORES

[75] Inventors: Douglas R. Shaw, Salt Lake City, Utah; Larry J. Buter, Highlands Ranch, Colo.

[73] Assignee: FMC Gold Company, Reno, Nev.

[21] Appl. No.: 921,534

[22] Filed: Jul. 29, 1992

[51] Int. Cl.$^5$ .......................... C22B 3/00; C22B 3/02
[52] U.S. Cl. ................................................ 75/744
[58] Field of Search ........................ 75/744; 423/34; 204/108

[56] References Cited

U.S. PATENT DOCUMENTS

| | | | |
|---|---|---|---|
| 3,793,429 | 2/1974 | Queneau et al. | 423/34 |
| 3,888,748 | 6/1975 | Brennecke | 204/108 |
| 4,647,307 | 3/1987 | Raudsepp et al. | 75/118 R |
| 4,739,973 | 4/1988 | Herndon | 266/101 |
| 5,005,806 | 4/1991 | Krauth | 266/101 |

Primary Examiner—Peter D. Rosenberg
Attorney, Agent, or Firm—Frank Ianno; Robert L. Andersen

[57] ABSTRACT

A hydrometallurgical process is described for recovery of a precious metals from ores refractory to treatment by lixiviating agents by crushing the ore to no finer than a nominal ¼ inch size, acidifying the ore with a mineral acid, treating the ore to a preliminary oxidation with nitric acid, optionally adding a binder to the oxidized ore, heap treating the ore with nitric acid to complete oxidation of the ore, water washing the heaped ore, optionally increasing the alkalinity of the heaped ore, heap treating the ore with a lixiviating solution and recovering precious metals from the lixiviating solution. The process recovers $NO_x$ gases generated during the preliminary oxidation and binder addition stage for conversion into nitric acid which is recycled for treating ore. Chemical treatments in the process can be carried out at ambient temperatures and atmospheric pressures.

22 Claims, 1 Drawing Sheet

RECOVERY OF PRECIOUS METAL VALUES FROM REFRACTORY ORES

BACKGROUND OF THE INVENTION

1. Field of the Invention

The invention is in the field of hydrometallurgical treatment of refractory ore for the recovery of precious metal values which are not readily recoverable by the use of ordinary lixiviants. The most common of these refractory ores are the sulfur containing ores that contain pyrite or arsenopyrite minerals.

2. Description of the Prior Art

With the depletion of reserves of high-grade ores, more interest is being focused to the recovery of gold and silver from "refractory" ores. Refractory ores are those ores from which common lixiviating agents, such as sodium cyanide or thiourea, are unable to leach high yields of a precious metal. The most common of these refractory ores are those that contain pyrite or arsenopyrite as sulfur containing compounds and such ores are not readily amenable to treatment by leaching. Conventional technology for attempting to recover the precious metals from these refractory ores is first to crush the ores in a series of crushers to obtain a $-\frac{1}{4}$ inch product. This $-\frac{1}{4}$ inch product is then further ground to $-200$ mesh (Tyler Series) and preferably to $-270$ mesh in order to assure good contact of the ore particles with the treating agent. In the next step, the ground ore is placed in an agitated reactor and treated with an oxidizing agent, such as nitric acid, under conditions of high temperature or high pressure or both. The use of autoclaves enabling pressures of 100 psig to be employed and temperatures of from 80°0 C. to 160° C. is technology known to the industry.

Subsequent to this ore oxidation, the resulting slurry is separated into residual solids containing precious metals such as gold and silver from the liquid fraction which contains solubilized, oxidized metal values. The residual solids then are treated to a standard, conventional extraction with lixiviants such as thiourea, sodium cyanide or other such treatment well known in the art. In this extraction stage, the residual solids from the oxidation stage are placed in an agitated vessel and treated with sodium cyanide solution or thiourea solution to dissolve the gold and silver from the residues of the oxidation step. Once solubilized, the gold and/or silver is precipitated by known techniques such as carbon treatment, zinc displacement or the like.

One such patented process is described in U.S. Pat. No. 4,647,307 issued to Raudsepp et al. on Mar. 3, 1987. In this patented process, an ore concentrate containing arsenopyrite or pyrite is finely ground, for example, 60% -200 mesh, and treated in an autoclave to decompose the arsenopyrite in acidic solution in a common volume space through the action of an oxidized nitrogen species in which the nitrogen valence is at least $+3$. The reaction is carried out at high temperatures, i.e., about 80° C. and at elevated pressures. The active oxidized nitrogen species are regenerated in the same common volume space by the injection of oxygen under these super atmospheric pressures. Such oxygen is injected into the autoclave and maintained at a partial pressure of from about 50 psig to about 100 psig. To assure proper mixing of the ore in the autoclave, an agitator is usually employed to keep the concentrate in suspension and thereby assure good contact of the ore with the treating ingredients in the autoclave. After this reaction has decomposed the arsenopyrite and pyrite, the residual solids can be treated for recovery of precious metals such as gold by conventional techniques such as thioureation, cyanidation or the like. In typical examples of the process, the concentrate employed contained about 7 ounces of gold per ton of concentrate and recovery of this gold was substantially increased when the preliminary oxidation step by an oxidized nitrogen specie was carried out.

U.S. Pat. No. 3,793,429 issued to Queneau et al. on Feb. 19, 1974 teaches a preliminary nitric acid treatment of copper sulfide ores and concentrates containing large amounts of copper and iron for recovery of the copper, silver and gold contained in the ore. In this process, the concentrate which contains about 28% copper, 25% iron, 3.5 oz/ton silver and 0.4 oz/ton gold per ton of concentrate is first ground to $-270$ mesh and subsequently leached with nitric acid at about 90° C. This action of the nitric acid converts the iron sulfide to hydrogen jarosite or equivalent iron precipitate. The concentrate after being treated by the nitric acid is subjected to a solids liquid separation. The liquid portion is subjected to intermediate purification and neutralization before it is sent to a copper electrowinning stage where copper is recovered. The solids portions which have been separated from the nitric acid leaching stage are treated in intermediate stages for removal of sulfur and unreacted sulfides, such as by froth flotation and ultimately passed to a cyanidation stage where the gold and silver are recovered from the insoluble jarosite.

These processes are difficult to carry out because they require high pressure and/or high temperature equipment such as agitated autoclaves and the like and are difficult to operate on a continuing basis and in large scale commercial operations. Further, the grinding or milling of the ore down to 200 mesh or 270 mesh is both time consuming and requires expenditure of large amounts of power. The initial crushing of the ore in stages down to a nominal $\frac{1}{4}$ inch to $\frac{3}{8}$ inch size is relatively easy and does not require excessive power inputs. However, the grinding and milling of the ore from these nominal sizes down to 200 mesh or 270 mesh requires separate milling operations with high power inputs and specialized grinding equipment. This can be avoided, of course, if the milling of the ore can be eliminated.

Another difficulty is that while the industry is attempting to recover precious metals from low grade refractory ores, the ores which are commonly utilized today contain at least 0.1 ounce of gold per ton of ore in order to assure an economic process. In general, the very low grade refractory gold ores, such as those that contain below 0.1 ounce of gold per ton, many of which contain only 0.05 ounces of gold per ton of ore, are generally too low grade to be processed economically by the present oxidative techniques illustrated in the two patents above, or by other known techniques including roasting or the use of autoclave processing.

SUMMARY OF THE INVENTION

In accordance with the present invention, a hydrometallurgical process for recovery of a precious metal from an ore which is refractory to treatment by lixiviating agents is described which comprises the following steps:

(a) crushing the ore to no finer than a nominal $\frac{1}{4}$ inch size, (b) treating the crushed ore with a mineral acid (preferably sulfuric acid) in amounts to bring the resulting mixture to a pH of about 2 or below (and preferably to a pH of about 1), (c) treating the acidified ore with from about 5% to about 200% of the stoichiometric amount of nitric acid required to react with the ore, and recovering any $NO_x$ gas evolved from the ore, (d) optionally, adding an acid resistant binder to the nitric acid-treated ore to form ore agglomerates capable of maintaining a porous bed of ore, maintaining the binder and ore in contact with each other for a sufficient curing time to permit the ore agglomerates to maintain their particulate form, and recovering $NO_x$ evolved in this step (d), (e) placing the thus-treated ore in a heap permeable ore bed on top of an impermeable collector, (f) heap treating the permeable ore bed by dispersing continuously or intermittently an aqueous nitric acid solution through the bed, (g) separating residual acidic liquor from the heap permeable ore bed, (h) water washing the heap permeable ore bed to remove nitric acid solution therefrom, and separating the washings from the ore bed, (i) introducing any $NO_x$ gases recovered from any of steps (c) and (d) into a nitric acid generator for converting the $NO_x$ into nitric acid and recycling said nitric acid for use in treating said ore, (j) optionally, treating the heap permeable ore bed with sufficient calcium, sodium or magnesium ions under alkaline conditions (preferably calcium carbonate, calcium hydroxide, calcium oxide, sodium hydroxide or magnesium hydroxide) to increase the pH of the liquor removed from the bed to about 10 or above, (k) treating the heap permeable ore bed by dispersing continuously or intermittently a lixiviate for precious metals through the bed, (l) separating the lixiviate solution containing dissolved precious metals from the heap permeable ore bed and recovering the said precious metals from the lixiviate.

The present invention is based on applicants' discovery that permeable beds of crushed refractory ore can be formed which are suitable for treatment by both heap oxidation and leaching. This requires that the ore be crushed to a relatively large size, that is, no finer than about ¼ inch nominal crush, without further milling of the ore to the usual −200 mesh (Tyler). If the crushed size of the ore is larger, that is, about ¾ inch to 1 inch, this ore size will usually yield a permeable bed without any further step. However, if the crushed size is about ¼ inch, depending on the amount of fines, it may be necessary to utilize additional binders to agglomerate particles of the ore in order to yield a permeable bed. Of great importance is the fact that the ore when used in these relatively coarse sizes does not diminish substantially the yield of precious metals recovered.

DETAILED DESCRIPTION OF THE INVENTION

In carrying out the present process, the ore which is employed is one that contains precious metals such as gold, silver or one of the platinum group metals, and which is refractory. Such ores are refractory when the precious metals cannot be extracted by conventional hydrometallurgical processes such as cyanidation, even when ground finely, because substantial amounts of the precious metals remain unaffected and unleached in the ore. Typical of refractory ores are those that contain substantial amounts of pyrite ($FeS_2$) or arsenopyrite (FeAsS) as the principal sulfides. Typically, the precious metals are associated structurally with sulfur and, therefore, are not easily accessed by lixiviants until the sulfur lattice is decomposed. The instant process is capable of treating refractory ores containing gold in amounts below about 0.1 ounce per ton of ore, and even gold quantities in amounts of 0.05 ounce and below per ton of ore, in an efficient and economical manner. This is in contrast to prior art processes in which a level of about 0.1 ounce of gold per ton of ore is the smallest amount of gold in the refractory ores which can be treatable by conventional oxidative techniques such as autoclaving or roasting followed by conventional gold leaching.

The above refractory ore is prepared for treatment in accordance with the present process by crushing it to no finer than a "nominal ¼ inch" crushed size. By "nominal ¼ inch" size is meant crushing to yield the maximum amount of particles having ¼ inch as their one largest dimension, but some particles, depending on the friability of the ore, will be finer than ¼ inch. Nominal crush sizes as large as ¾ inch to 1 inch are also desirable and work very well in the instant process. Further milling of the ore to particles smaller than a nominal ¼ inch crush is not desired since it will adversely affect the required porosity of the ore bed in latter stages to be discussed below.

In the first step of the process, the ore after being crushed as set forth above is treated with a mineral acid which reacts with the acid-consuming minerals in the ore and permits the aqueous phase of the slurry in contact with the ore to reach a pH of about 2 or below, and preferably pH of 1 and below. The preferred mineral acid used is sulfuric acid although any mineral acid such as hydrochloric, nitric or phosphoric acid can be employed. Sulfuric acid is preferred because it is inexpensive, readily available, and is very effective in converting the acid-consuming minerals into water-soluble sulfate salts and reducing the aqueous liquor in contact with the ore to a pH of at least 2 and preferably about 1. The acid-consuming salts which react with the mineral acid include calcium salts, present mainly as calcium carbonate, calcium oxide and in solution as calcium hydroxide; magnesium, present as magnesium carbonate, magnesium hydroxide or magnesium oxide; and, in general, most cation species which are well known to consume acid. When the salts are reacted with sulfuric acid they are converted to their corresponding metal sulfates. Illustrative of this reaction is that which takes place between calcium salts and sulfuric acid shown below:

$$H_2SO_4 + CaCO_3 \rightarrow CaSO_4 + H_2O + CO_2$$

In general, a high strength acid is employed during this first treating step. For example, if sulfuric acid, the preferred mineral acid is employed, it is used in about 98% by weight $H_2SO_4$. Enough acid is added to the ore to bring the pH of the aqueous phase of the mixture in contact with the ore to a pH of about 2 or below and preferably about 1 or below. In general, when sulfuric acid is employed it is found that amounts of from 5 pounds to 30 pounds of sulfuric acid (100% H₂SO₄ basis) is required per ton of ore being treated.

Since the initial mineral acid that is added to the ore functions primarily to acidify the ore and react with acid-consuming minerals it is desired to use the least expensive mineral acid that can achieve the dual ends of reacting with the acid-consuming minerals of the ore and further reducing the pH of the aqueous phase in contact with the mixture to a pH of 2 or below. This avoids consumption of more expensive nitric acid which is used in the second step of the process for acidifying the crushed ore. This first stage is preferably carried out in some kind of rotary mixer or pug mill which allows intimate contact of the mineral acid and the crushed ore. If sulfuric acid is used as the mineral acid, the reaction between the crushed ore and the mineral acid may liberate carbon dioxide which can be vented without difficulty to the atmosphere. Such reaction will occur only in the presence of carbonotite minerals; in the absence of these minerals, no $CO_2$ evolution will occur. However, if for some reason nitric acid is employed as the preliminary treating mineral acid some $NO_x$ gases may be liberated and these must be collected and recycled along with other $NO_x$ gases which are collected elsewhere and recycled as set forth below. Since it may be necessary to collect the gases emanating from the reaction of the crushed ore and the primary mineral acid, if this acid is nitric acid, it is desired to utilize equipment which is closed and facilitates collection and recycle of any $NO_x$ gases which are liberated. In industrial practice, rotary mixers and pug mills from which evolved gases can be collected are preferred. These rotary mixers are in the form of inclined elongated tubes or cylinders mounted on rotating supports which turn the elongated tubes and permit the contents of the tube to be constantly mixed as it proceeds from one end of the tube to the other. Mixing can also be accomplished using pug mills, rotating pans, discs, and other forms of pellitizing devices. Mixing of the mineral acid and crushed ore can also take place in any equipment designed to tumble, agglomerate and/or pelletize mixtures. The reaction of the ore and mineral acid can be carried out at ambient temperatures and atmospheric pressures. It is preferred to employ concentrated mineral acids in this treating step to avoid having excessive amounts of liquids, for example, greater than about 12% by weight, mixed with the crushed ore since larger amounts of liquid make the mixture difficult to work with in the rotary mixers. While amounts of liquids greater or less than the 12% by weight may be employed it is preferred to use that quantity of liquid which will ensure easily handling of the ore mixture and this will vary depending on the make up of the various ores.

In the second step of the process, the acidified ore is treated with nitric acid in a second rotary mixer or pug mill in order to carry out a preliminary oxidation step. Mixing of the acid and ore may also be accomplished by tumbling, agglomerating or pelletizing the crushed ore with the acid. This preliminary oxidation step can be carried out at ambient temperatures and atmospheric pressures. The nitric acid used in the second step has a relatively high concentration, from about 20 weight percent to about 70 weight percent $HNO_3$. In this step, only a portion of the nitric acid that is used to react with the ore in the instant process is added. This amount may vary from 5% to 200% by weight of the stoichiometric amount of nitric acid required to react with the sulfides or arsenopyrite in the ore. The purpose of adding only a part of the nitric acid during this second step is to permit the most vigorous part of the reaction to take place in a rotary mixer or pug mill, where $NO_x$ which is liberated rapidly and vigorously, can be recovered from the mixer and be available for recycle as set forth below. In general, when nitric acid is first added to the ore the initial phases of the reaction are very vigorous with large quantities of $NO_x$ being evolved. In order to reduce the cost of the nitric acid being used in the process, the large quantities of $NO_x$ which are given off in the early phases of the reaction are recovered and recycled for conversion back into nitric acid for reuse in the process. The amount of nitric acid which is employed in this step is that amount which permits completion of the most vigorous portions of the reaction to take place. As larger amounts of nitric acid are used in this step, it will be seen that the reaction intensity in the later stages of the reaction will diminish as will the evolution of $NO_x$. The remaining amount of nitric acid required to completely treat the ore is utilized in a separate step downstream.

The function of the added nitric acid is to oxidize the pyrite and arsenopyrite in the ore thereby removing the refractory nature of the ore. The sulfides and arsenopyrite are oxidized by nitric acid in accordance with the following overall equations:

$$2FeS_2 + 10HNO_3 \rightarrow Fe_2(SO_4)_3 + H_2SO_4 + 10NO + 4H_2O \text{ and}$$

$$3FeAsS + 14HNO_3 + 3H^+ \rightarrow 3Fe^{+3} + 3SO_4^{-2} + 3H_3AsO_4 + 14NO + 4H_2O$$

After removal of the nitric acid treated ore from the second rotary mixer, the ore is optionally treated in a third rotary mixer or pug mill which also functions as an agglomerator. In this third rotary mixer, the ore is treated with a binder to assist in agglomerating fine particles present in the crushed ore. The purpose of this optional agglomerating step is to assure that the nitric acid treated particles can be subsequently stacked into permeable beds. By permeable beds is meant the state where the treated ore can be heaped in beds which are sufficiently permeable that liquid treating agent applied at the top of the bed will readily permeate through the bed and thereby contact the particles of the ore, without agitating, mixing or like of the bed.

At the outset, it should be noted that nitric acid when added to the ore in the prior step itself acts as a binding agent to aid in agglomeration of any fines in the ore. The need for an agglomeration step with added binding agents is determined by two factors. One is the amount of fine grain particles, for example, finer than 150 mesh or 200 mesh, in the crushed ore. The more fines the greater the likelihood will be of an impermeable condition, and, therefore, the greater the need for an agglomerating step and binding agents. In general, the fine grain particles are caused by crushing the ore to the smaller size specifications. For example, ore crushed to a nominal ¼ inch crush will have more fines than an ore crushed to a nominal ⅜ inch size. The second factor is the degree of particle decrepitation or disintegration that will occur due to the reaction of the acids. This depends on the mineralogical and textural characteristics of the ore that is being treated and how it behaves when acid treated, particularly when it is oxidized with nitric acid. Again, a large amount of particle decrepitation increases the chance for an impermeable bed and requires a separate agglomeration step with binder addition.

In certain ores treated by applicants where the amount of sulfides that are subject to chemical attack is relatively small, the amount of particle decrepitation is negligible and is not a factor. In these ores, the amount of fines in the samples determine the need for using a binding agent. This is best illustrated by comparison of an ore crushed to a nominal ⅜ inch size and the same ore crushed to a nominal ¼ inch size. The ⅜ inch crushed ore has a substantially coarser particle size distribution and much less fine grain particles than does the ¼ inch nominal crush sample. The ⅜ inch nominal crush sample needed no binding agents in the instant process since it readily formed permeable beds after initial treatments with sulfuric acid and nitric acid, while the nominal ¼ inch crush sample which had a higher percentage of fine grain particles required an agglomeration step with an added binder in order to produce permeable beds of the ore.

When agglomeration with a binder is required, an acid resistant binder is dispersed in water by high shear mixing to form a very dilute dispersion of the binder, for example, below about 1% by weight and preferably about 0.5 weight percent by weight of the binder. This is then sprayed or otherwise dispersed on the surface of the ore while the ore is being mixed in equipment such as a rotary mixer or the like. The same type of rotary mixer can be used as employed in steps 1 and 2 of the present process and such treatment can be carried out at ambient temperatures and under atmospheric pressures. The total amount of binder used need not be very high in that less than 1 pound per ton of ore has been found sufficient for this purpose. Specifically, amounts of 0.64 pound of binder per ton of ore and 0.4 pound of binder per ton of ore, and as low as 0.2 pound of binder per ton of ore have been successfully used in different runs in which the process has been successfully carried out.

The acid resistant binders which have been found operable include Cellulon TM, a Weyerhauser Company product which is a reticulated network of micron-sized needle-shaped solid cellulose fibers. The product has a fiber diameter of 0.1 micron, a surface area of 260,000 cm2/gram and its solid form composition is 15–20 weight percent bacterial cellulose, 1% by weight maximum of lipopolysaccharide and 79–85 weight percent water. Also, Avicel TM microcrystalline cellulose, an FMC Corporation product, can be used as the binder. Avicel TM is a purified depolymerized native cellulose in spherical-shaped microcrystalline form. Another useful binder is Nalco TM agglomeration aid, a Nalco Chemical Company product, which is a polyacrylamide polymer flocculant supplied in a hydrocarbon solvent and water.

It is essential that the binding agent used in an agglomeration step be stable and not otherwise affected by acidic conditions, especially at the pH of about 1 which is the normal pH of the acidified ore after nitric acid treatment. Conventional agglomerating agents used in the prior art for other purposes such as lime or lime and cement cannot be used as a binder in this process. In such conventional processes, lime acts as the coagulating agent for the fines while cement sets up the agglomerates into hard particles. However, at acid pH's of about 1 such reagents react with these basic elements and loss their agglomerating properties. The binder should also be capable of being stable under alkaline conditions, for example, at pH values of 10 and above, when a downstream cyanidation is to be carried out which requires treatment of the ore and binder under such alkaline conditions. All of the above binders are workable under such acid and/or alkaline conditions.

It should be noted that the nitric acid added in the prior step before the optional agglomeration step continues to react with the ore to oxidize the sulfides and release $NO_x$. This reaction will continue during the binder step as long as unreacted sulfides and/or nitric acid is present. In the interest of recapturing as much $NO_x$ as possible, any $NO_x$ which is given off during this agglomerating stage should also be recovered and recycled along with the $NO_x$ which is recovered from the second step nitric acid treatment of the ore.

In the fourth step of the process, the curing/oxidation step, the acid treated ore, with or without a binder treatment, is allowed sufficient residence time to permit the nitric acid to penetrate the ore completely and continue the oxidation. This step need not be carried out in separate equipment as a separate treating stage but instead can be an extension of the residence time of either the second step nitric acid treatment and/or the third step agglomeration treatment. In general, the wet agglomerates which have been formed in the second stage nitric acid treatment and which may have been further enhanced with a binder in the third step agglomeration stage, will upon sufficient residence time have sufficient strength to impart to the overall treated ore a porosity which permits the resulting ore to be stacked into permeable beds for subsequent treatment. This curing/oxidation step, like steps 1 to 3 above, also can be carried out at ambient temperatures and under atmospheric pressures.

During this curing/oxidation stage, residual nitric acid from the second treating step may continue to react with the ore to oxidize the sulfides and to form $NO_x$. This $NO_x$ should be recovered with the other $NO_x$ which is formed and collected in step 2 (nitric acid treatment) and step 3 (agglomeration with a binder) for recycle in forming additional nitric acid. At the end of this fourth step (curing/oxidation), the amount of $NO_x$ formed by any continuing reaction of the nitric acid and the ore will be very small with virtually all of the $NO_x$ formed during this and prior steps having been collected and recycled for production of additional nitric acid.

In step 5, a heap oxidation step is carried out. In this specification and claims, the term "heap" or "heaped ore" treatment is meant to convey the method of treating ores by placing them in heaped beds or piles, normally outside and in the open, and stacking in lifts up to heights of about 200 feet and which rest on an impermeable collector or other conventionally used liner normally employed for liquid recovery in heap treatment. The heaped ore must be in permeable piles or beds which are then conventionally treated by some liquid which is sprayed or otherwise distributed on top of the heaped ore and allowed to permeate downwardly through the bed. The liquid contacts the particles in the bed for whatever chemical or physical treatment is to be carried out, such as, for example, chemical oxidation or selective dissolution, and recovered liquids are collected from the liner.

The treated ore from step 4 is placed in a heap on an impermeable collector such as a polyethylene sheet, but in which the heaped ore forms a permeable bed. A dilute solution of nitric acid, which may have a concentration of from about 2 weight percent to about 20 weight percent nitric acid, is then distributed on top of the heaped ore by spraying or drip and permitting the dilute nitric acid to permeate downwardly through the bed and react with the ore. This added, dilute nitric acid continues the oxidation treatment of the ore to complete oxidation of the sulfides and other refractory materials in the ore. This treatment is carried out for extended periods of time, for example, 2 weeks to 4 weeks, normally at ambient temperatures and under atmospheric pressures. Any $NO_x$ generated during the step is given off very slowly and in very dilute concentration to the surrounding atmosphere. It is not recovered. Liquor which is added to the top of the heap and which penetrates the permeable bed of ore is constantly collected on the impermeable collector and separated from the solid ore.

Heap lixiviation is conventionally used in the art to leach ores which are not refractory by passing a dilute lixiviate such as sodium cyanide solution through the bed in order to leach precious metals such as gold from the bed. The present heap oxidation stage is carried out in essentially the same manner except that the ore is being oxidized by treatment with dilute nitric acid to complete oxidation of the ore while the ore is maintained in a heap. In such a heap oxidation stage, the bed must be permeable to permit the dilute nitric acid distributed on top of the bed to penetrate the bed and be able to contact each of the particles which make up the bed. The formation of such a permeable bed is impossible with ores that are milled to the conventional 200 mesh or finer (Tyler mesh).

During the heap oxidation step, any residual liquor associated with the heaped ore resulting from the initial mineral acid treatment and nitric acid treatment continually drains and is separated, and preferably recovered, from the heaped ore. This residual liquor contains dissolved metal ions such as iron, sulfur and arsenic, a good portion of which is in the form of sulfates or, in the case of arsenic, as acids. The dilute nitric acid which is dispersed over the top of the bed also tends to wash this residual liquor and displace it from the heaped bed. Additionally, the added nitric acid also reacts further with any sulfides and the like to completely oxidize them in order to make the precious metals available for subsequent recovery. Since the dilute nitric acid which is distributed over the top of the permeable heaped ore bed is employed in greater than stoichiometric amounts some unreacted dilute nitric acid will be carried over in the liquor separated from the bed. This liquor will normally have a pH of no higher than 2 and preferably about 1. Any $NO_x$ values which are evolved during this heap oxidation will in part contact the excess nitric acid solution being distributed over the bed and will dissolve therein. This permits recovery of substantial $NO_x$ values evolved from the heaped ore. Any undissolved $NO_x$ which is evolved from the bed will be dispersed in the atmosphere; however, this constitutes a very small amount of $NO_x$ compared to that recovered from the bed by dissolving $NO_x$ in $HNO_3$ and that recovered and recycled in the first portion of the process. Its loss is not considered economically significant.

After the heap oxidation has gone to completion, the addition of dilute nitric acid is stopped and replaced by water in order to wash down the heaped ore. The water wash is continued until there is a substantial increase in pH indicating a substantial removal of the residual nitric acid in the heaped ore. The water wash has two purposes. Initially, it seeks to recover substantial portions of unreacted nitric acid which remains in the heaped ore. Further, the water wash dilutes and removes the last traces of residual liquor in the heaped ore that contain dissolved metal sulfates, metal acids, or sulfuric acid, if any remains unreacted. It is important in the carrying out of the instant process that the sulfate and nitrate ions be removed by the water wash from the ore either completely or in such substantial amounts that any residual sulfates and nitrates do not interfere with the next step which is the neutralization step. In general, when the water wash is carried out to a point where the recovered wash water has a pH of about 3 or above, the wash has been sufficient to eliminate the troublesome sulfate and nitrate ions from the heaped ore.

In the next neutralization stage, the washed ore is then treated with milk-of-lime, or, preferably, lime-saturated and clarified water, or other suitable alkaline calcium, sodium or magnesium compounds to raise the pH of the liquid emanating from the heaped ore to a value of 10 or above. Calcium carbonate, calcium hydroxide, calcium oxide, sodium hydroxide or magnesium hydroxide and the like are all suitable for this purpose. The neutralization is carried out to prepare the heaped ore for lixiviation with sodium cyanide solution. During this stage, little or no gypsum is formed on the heaped ore because of the elimination or substantial removal of the sulfate ion from the heaped ore. It is necessary to raise the pH of the heaped ore to at least about 10 in order to prepare it for lixiviation with materials such as sodium cyanide. A pH of at least 10 is required to avoid the possible reaction of sodium cyanide and formation of hydrogen cyanide which is volatile and toxic. It is unusual to carry out this neutralization step from about pH 3 to pH 10 and above in a heaped ore that has contained sulfate without precipitating gypsum or other insoluble calcium salts. The precipitation of gypsum throughout the heaped ore cannot be tolerated since such precipitate would prevent proper lixiviation of the precious metals from the heaped ore. The avoidance of gypsum and other insoluble calcium salts is achieved in the present process by the separation of the residual liquor containing such salts on a continuing basis from the heaped ore during the oxidation stage, the continued dilution of the sulfate liquor with added dilute nitric acid and finally the essentially total removal of the sulfate ion from the heaped ore by the final water wash after the oxidation step. Also, it is unlikely that any undesirable calcium or sodium nitrates will be generated, due to efficient water washing.

Once the heaped ore has been neutralized to pH 10 or above it can be treated by a lixiviate to heap leach the gold and other precious metals from the solution by known techniques. The preferred lixiviate is sodium cyanide. Another lixiviate such as thiourea can also be employed; however, since it functions under acid conditions, neutralization of the ore to pH 10 is not required. Sodium cyanide is preferred because it yields the highest gold recovery of the tested lixiviates. In carrying out this step, the lixiviate such as dilute sodium cyanide is distributed over the top of the heaped ore bed and allowed to percolate through the bed where it dissolves the gold and other precious metals. The resulting pregnant solution is recovered, passed through a carbon bed or otherwise treated with zinc to recover the gold. The remaining heaped ore bed is washed to detoxify the residual cyanide and the washed ore is disposed of in a heap.

In the above process, the heaped ore can be subjected to a number of treating steps without having to move or disturb the bed. It is treated first to heap oxidation by addition of nitric acid for final oxidation of any remaining sulfide compounds; next, it is water washed; subsequently, it is treated with lime in a neutralization step; finally, it can be treated with sodium cyanide to heap lixiviation, all of these steps being carried out without having to disturb the bed in any way. Of course, if land space requirements for processing the heap are limited, movement of the heap between these treating steps can be carried out without adversely effecting the process, but such movement of the heap is neither necessary or desired to obtain good precious metals recovery. The key to these varied heap treatments is the maintenance of a permeable bed so that the treating liquor which is dispersed over the top of the bed can permeate through the bed and contact the ore particles within the bed. Since the heaped ore is normally outside and in the open, each of these treating steps is most conveniently carried out at ambient temperatures and under atmospheric pressures.

To increase the efficiency of the process and reduce the amount of treating chemicals required, recovery and recycle techniques are employed wherever cost effective. For example, the residue liquor recovered from the heap oxidation step which contains unreacted nitric acid as well as dissolved metal sulfates and acids is treated in a recovery stage to recover the unreacted nitric acid from the liquor. A typical analysis of this liquor is set forth below:

| Species | Unit | Column Assays |
|---|---|---|
| $Fe_2(SO_4)_3$ | g/l | 14.3 to 40 |
| $Fe(NO_3)_3$ | g/l | 3.8 to 5.8 |
| $H_2SO_4$ | g/l | 0.0 to 0.4 |
| $HNO_3$ | g/l | 35.3 to 60 |
| $HAsO_3$ | g/l | 2.4 to 4.9 |
| Total H+ | g/l | 0.58 to 0.78 |
| | % as $HNO_3$ | 95.0 |
| | % as $HAsO_3$ | 5.0 |

This nitric acid recovery can be done by feeding this residue liquor (and any heap washings) having a pH of about 1 into an ion exchange or electrodialysis unit which separates the residual nitric acid from the remaining liquor. In the case of ion exchange, the acid is adsorbed selectively with a weak base resin as follows:

$$R \text{ (empty resin site)} + H^+ + NO_3^- \rightarrow R-HNO_3^-$$

Elution of the resin with water yields dilute $HNO_3$ which can then be recycled to the heap oxidation step.

The effluent from such ion exchange unit which contains metal sulfates is treated with calcium carbonate, calcium oxide, or other suitable calcium salts until it reaches a pH of about 4.5, or to as high as pH 11 if desired. This results in a stable precipitation of metal sulfates, as shown below:

$$Fe_2(SO_4)_3 + 3Ca(OH)_2 + 6H_2O \rightarrow 2Fe(OH)_3 + 3CaSO_4.2H_2O \downarrow$$

$$2H_3AsO_4 + 3Ca(OH)_2 + 2H_2O \rightarrow Ca_3(AsO_4)_2 \downarrow + 6H_2O$$

$$H_2SO_4 + Ca(PH)_2 \rightarrow CaSO_4.2H_2O \downarrow$$

$$2H_3AsO_4 + Fe_2(SO_4)_3 \rightarrow 2FeAsO_4 + 3H_2SO_4$$

The slurry is then filtered to remove barren filtrates from the residue which is disposed of in its stable form.

In some cases, the recovered liquor from the heap oxidation step may contain recoverable amounts of dissolved gold or dissolved silver in addition to dissolved metal sulfates. Recovery of these precious metal values is possible by passing the recovered liquor through a carbon column where the gold and silver will be separated selectively from the other metal ions which pass through unaffected. This can be continued until the carbon column has been loaded sufficiently. It then can be treated in any conventional way for recovery of the gold and silver from the carbon column.

Another important chemical recovered in the process is $NO_x$. This term covers the many oxides of nitrogen formed when $HNO_3$ is used as an oxidizing reactant, the most stable being NO and $NO_2$. Such $NO_x$ is recovered from the rotary mixers where nitric acid treatment, agglomeration and curing/oxidation take place. The $NO_x$ is sent to a nitric acid generator, such as one of the commercially available air absorption generators, for conversion of the $NO_x$ into nitric acid. The nitric acid from the generator is then recycled for treating additional ore. $NO_x$ values which are liberated during the heap oxidation step are normally absorbed in the added aqueous nitric acid which permeates the bed with a liquid film throughout the porous heaped ore. This liquid film helps to absorb the $NO_x$ released during the heap oxidation stage and such $NO_x$ can be air oxidized to nitric acid and recovered. Unavoidably, minor amounts of $NO_x$ escape from the heap and are not recovered, but are not sufficient to have an adverse economic effect on the process.

Figure 1:
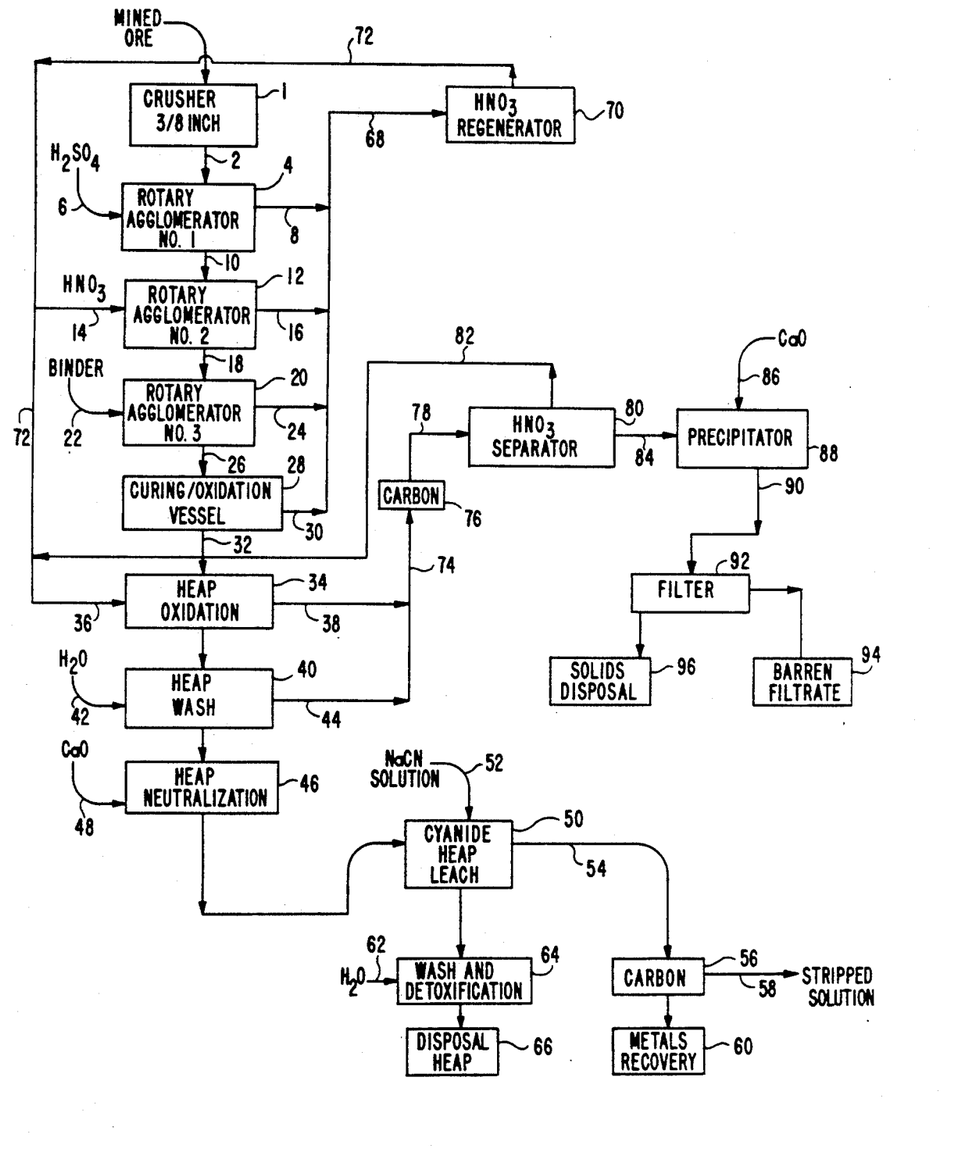
FIG. 1 illustrates a flow sheet of the process of the invention in block form.

The process will now be described with reference to the drawing which is a flow sheet of the process in block form. In the first stage of the process, the mined ore is crushed in crusher 1 to a size no finer than about a nominal ½ inch crush, for example, a nominally ⅝ or ¾ inch crush. The crushed ore is conveyed via line 2 to a first rotary mixer 4 where it is mixed with a mineral acid 6 and preferably concentrated sulfuric acid until it reaches a pH of about 1. This mineral acid is added to neutralize any acid-consuming minerals in the ore and to convert these minerals into a soluble form in the added acid. If sulfuric acid is utilized in this step, the gas generated in the rotary mixer 4 and vented through line 8 will probably be carbon dioxide and this can be vented to the atmosphere. However, if another mineral acid such as nitric acid is employed, then the reaction may liberate some $NO_x$ through line 8 and this should be recovered from the rotary mixer. Since any mineral acid will achieve this neutralization reaction and solubilize the acid-consuming minerals it is preferred to use an inexpensive acid such as sulfuric acid to achieve this purpose. Further, it is desired to have the dissolved minerals present in their sulfate forms and sulfuric acid will achieve this objective readily. However, regardless of the mineral acid that is employed, some sulfates will form since pyrite and arsenopyrite in the ores will in part be converted to sulfates.

The ore resulting from the mineral acid treatment in reactor 4 is then passed through line 10 into a second rotary mixer 12 into which nitric acid, preferably concentrated nitric acid, is added via line 14 into the secondary mixer 12. A vigorous reaction occurs in which the nitric acid oxidizes sulfide compounds and the like. The vigorous reaction releases much $NO_x$ gases from the mixer and these are removed via line 16 and recovered. The nitric acid added in this stage, in amounts of from 5% to 200% by weight of the stoichiometric amount of $HNO_3$ required to react with the sulfides in the ore, assures recovery of $NO_x$ vigorously given off during the initial oxidation stages.

The nitric acid treated ore is then passed via line 18 into a rotary agglomerator 20 where an acid resistant binder 22 is added to the ore so that it is distributed throughout the ore body. The purpose of the binder is to obtain good agglomeration of any fines that are in the ore and to assure that a permeable bed of the ore can be formed in subsequent stages of the process. This step is an optional step in that if the crushed ore is of sufficiently large size and the amount of fines in the ore are insufficient to cause plugging of a bed of the ore, this step can be eliminated. During this step, the nitric acid previously added in the second rotary mixer will continue to react with sulfides in the ore and continue to release $NO_x$ gases from this rotary agglomerator. These $NO_x$ values are recovered and recaptured via line 24 for subsequent use.

The thus-agglomerated ore from rotary agglomerator 20 is then passed via line 26 into a curing/oxidation vessel 28. This vessel permits the thus-treated ore residence time in order to form firm wet agglomerates which will permit the formation of a permeable bed of the ore in subsequent treating stages. It is shown as a separate vessel 28. However, it can be simply a continuation of the second rotary mixer 12 or the rotary agglomerator 20 which permits the mixture sufficient residence time to complete agglomeration. It should be noted that the nitric acid reactant in the second rotary mixer 12 also acts as an agglomerating agent as well as a reactant and this reagent acting alone or in combination with the binder, given sufficient residence time, will act to bind the fines into agglomerates. Any $NO_x$ gases which are liberated in vessel 28 are captured and returned via line 30 for reuse.

The ore which is undergoing treatment in the prior rotary mixers 4 and 12, rotary agglomerator 20 and curing vessel 28 should be kept as dry as possible by using concentrated reagents so that the amount of liquid in contact with the ore does not become excessive and make the mixture "sloppy" to handle in the rotary equipment. In general, when the liquid level is controlled to no higher than about about 12% by weight the ore mixture can readily be handled in the rotary mixers and agglomerators employed in the prior steps. Liquid levels above this value make handling of the ore more difficult.

The mixture of ore and treating materials from vessel 28 is then removed via line 32 and placed in a heap permeable ore bed 34 on top of an impermeable collector (not shown). The heap may be stacked in lifts as high as 200 feet or less and is usually placed outside on conventional liners used in heap treatment of the ores such as polyethylene sheets of either low or high density or equivalent. Dilute nitric acid from line 36 is then distributed on top of the heap 34 in concentrations of about 2% to about 20% by weight, with a preferred concentration of about 6% to about 10% by weight nitric acid. The dilute nitric acid is added to the top of the heap by spray or drip means that permit the dilute nitric acid to penetrate into and through the permeable bed, contacting the ore particles as it flows downwardly through the bed. This nitric acid treatment of the heap oxidizes any residual sulfides in the ore heap and completes the oxidation of refractory values in the ore which was begun in rotary mixer 12. Simultaneously, any liquids containing soluble metal sulfates which were formed in the earlier treating stages and which are mixed with the ore continually drain and separate from the ore heap and are collected as residue liquor. In this way, soluble metal sulfates and acids and the like are constantly being eliminated from the ore heap. The added dilute nitric acid which contains large amounts of water also helps to wash away any residual sulfate and acid values which are present in the ore heap. The residue liquor which is recovered in the impermeable collector and which is at a pH of about 1 is removed via line 38 and recovered for further use. $NO_x$ values which are liberated from the oxidation heap redissolve in part in the aqueous nitric acid treating solution which is distributed on top of the heap and continually wets down the heap as it flows through the permeable heaped ore. The absorbed $NO_x$ is converted to nitric acid because of the presence of oxygen from the atmosphere and is included in the liquor removed from heap 34 through line 38.

When oxidation has been completed, nitric acid addition through line 36 is stopped and a washing step 40 with water added through line 42 is commenced. In this washing and subsequent treatments, the heap need not be moved or disturbed during treatment with the various treating agents. The heap 40 is then washed to remove any residual sulfate which may be present in the ore heap and also to remove as much of the nitric acid as is practical. In general, when the exit wash water in line 44 reaches a pH of about 3 the washing has been sufficient for these purposes. The wash water is removed and recovered via line 44 for subsequent use.

After the washing step has been completed, the heap is treated in a neutralization stage 46 with calcium carbonate, calcium hydroxide, calcium oxide, sodium hydroxide or magnesium hydroxide introduced via line 48 so that the pH of the ore mixture is at least 10. While any calcium compound which is sufficiently alkaline can be employed for this purpose, it is preferred to use milk-of-lime or lime saturated and clarified water for this purpose. This heap neutralization step is necessary if the lixiviate to be employed is an aqueous sodium cyanide solution, which is preferred. However, if other lixiviates such as thiourea are employed, this neutralization step can be eliminated since thiourea operates under acid conditions.

The ore residue, having now been neutralized to a pH of about 10 or above is susceptible to being lixiviated with sodium cyanide solution for removal of its precious metals. The heaped ore is next treated to a cyanide heap leach 50 by distributing dilute sodium cyanide solution from line 52 on top of heap 50 and allowing the cyanide solution to leach gold and silver and other precious metals from the ore. The precious metals are solubilized in the pregnant solution which is removed via line 54 while the ore freed of its precious metals is treated with water or oxidant added via line 62 to the heap 64 to detoxify it. Once detoxified, the resulting ore heap 66 is reclaimed. Alternatively, the residue can be left to operate with cyanide leaching for the purpose of long term recovery of the small amount of residual precious metals. The pregnant solution 54 is passed through a carbon column 56 and the precious metals such as gold and silver are adsorbed on the carbon column. The solution stripped of its precious metals is removed via line 58 for recovery of the cyanide solution, recycled or otherwise disposed of. The carbon 56 loaded with gold is then treated in a conventional manner in a metal recovery step 60 in order to recover the gold and other precious metals from the carbon column.

In order to minimize cost of reagents used in this process, the $NO_x$ gases which are recovered from lines 16, 24 and 30 and possibly line 8 are collected and together sent via line 68 into a nitric acid regenerator 70 which can be of conventional design. Commercial air absorption generators are suitable for this purpose. The nitric acid thus regenerated is removed via line 72 and passed via line 14 into the secondary rotary mixer 12 for use in ore treatment in that stage. Some of the regenerated nitric acid, if diluted, can also be passed via line 36 into the oxidation heap stage 34 for heap oxidation of the ore.

In this process, some gold and silver or other precious metals may be dissolved in the residue liquor 38 recovered from the heap oxidation. This residue liquor which is recovered via line 38, as well as washings from line 44, are together blended in line 74 and can be passed into a carbon column 76 to recover minute amounts of gold and silver or other precious metals that may have been dissolved in these liquors. The residue liquor after having been passed through carbon column 76 for recovery of any precious metals dissolved therein is then passed via line 78 into an ion exchange or electrodialysis unit 80 where nitric acid is separated from the remainder of the liquid stream. The nitric acid is then passed via line 82 and recycled back for use in line 72 to supply nitric acid via line 36 for heap oxidation in stage 34. The residue liquor that has passed through the ion exchange unit 80 is removed via line 84 and is treated with calcium carbonate, lime, calcium hydroxide or other alkaline calcium compounds via line 86 to precipitate metal impurities in unit 88. The most common metal precipitates are gypsum, $Ca_3(AsO_4)_2$ and $FeAsO_4$. The precipitation is normally carried out so that the pH of the solution reaches about 4.5, although pH's up to 11 are also acceptable. The slurry from the precipitation step 88 is then passed via line 90 to a filter 92 where the barren filtrate 94 is separated from the solids 96 which are sent to disposal.

EXAMPLE 1

Ore Sample and Analysis

Baseline agitation leaching tests were conducted on gold ore samples A and B to define the degrees of refractoriness and to determine the amenability of the ores to conventional nitric acid pre-leaching. Chemical assays of the ores were:

|  | Ore Sample | |
| --- | --- | --- |
| Component | A | B |
| Au, oz/ton | 0.068 | 0.058 |
| Ag, oz/ton | 0.03 | 0.06 |

|  | Ore Sample | |
| --- | --- | --- |
| Component | A | B |
| $S^{2-}$, % | 1.72 | 2.70 |
| $SO_4$, % | 0.03 | 0.14 |
| Fe, % | 3.21 | 3.54 |
| As, % | 0.66 | 0.194 |
| $C_{Total}$, % | 0.22 | 0.29 |
| $CO_2$, % | 0.30 | — |

Pyrite and arsenopyrite are the principal sulfide minerals in the ores. Ore sample A is a quartizite ore (QTZ) type, whereas B is a quartz monzonite ore (QMP). Silicification in either sample is small to moderate. Both ores are from prosepective commercially exploitable resources.

To determine the degree of refractoriness and the effectiveness of conventional nitric acid pre-leaching, representative samples of minus 10 mesh ore were ball mill ground to 80% minus 200 mesh and agitation leached as follows.

|  | Test Numbers | | |
| --- | --- | --- | --- |
|  | 1 | 2 | 3 |
| Pretreatment | none | none | w/$HNO_3$ |
| % solids | 40 | 40 | 40 |
| NaCN, g/l | 1.0 | 1.0 | 1.0 |
| CaO, pH | 11.5 | 11.5 | 11.5 |
| Aeration | yes | yes | yes |
| Carbon, g/l | none | 30 | 30 |
| Time, hours | 48 | 48 | 48 |
| Temperature | ambient | ambient | ambient |

In Test No. 3, pretreatment conditions were as follows:

| Pre-acidification: | |
| --- | --- |
| $H_2SO_4$: | 34 lb/ton |
| Ore slurry pH: | 2.0 |
| Time: | 30 minutes |
| $HNO_3$ Oxidation: | — |
| $HNO_3$ added: | approximately 260 lb/ton of ore |
| Stoichiometry: | 154% for ore A |
|  | 110% for ore B |
| Temperature: | 85–90° C. |
| Pressure: | Atmospheric |
| Time: | 4 hours |
| Headspace | |
| Atmosphere: | $N_2$ |
| Final slurry pH: | 1.0 |

The acidic slurry in Test No. 3 was filtered, water washed, and neutralized before conducting cyanidation with carbon (CIL). The CIL test is carried out with conventional agitation or stirred cyanidation ($CN^-$) except that activated carbon is added to the cyanidation slurry. This prevents dissolved gold in the cyanidation solution from being adsorbed by, and thus lost to, any organic constituent of the ore ("pregrobbing") because the activated carbon has a much higher affinity for the gold than the organic constituent.

| Ore Samp | Test # | Test Basis | Calc's Head Assays oz Au/ton | Au Dissolution, % | Leach Residues oz Au/ton | Reagent Consumptions, lb/tn ore | |
| --- | --- | --- | --- | --- | --- | --- | --- |
|  |  |  |  |  |  | NaCn | CaO |
| A | 1 | $CN^-$ | 0.066 | 9.2 | 0.060 | 2.2 | 3.1 |
| A | 2 | CIL | 0.063 | 11.6 | 0.056 | 4.6 | 3.1 |
| A | 3 | $HNO_3$/ | 0.070 | 87.2 | 0.009 | 4.5 | 4.0 |

| Ore Samp | Test # | Test Basis | Calc's Head Assays oz Au/ton | Au Dissolution, % | Leach Residues oz Au/ton | Reagent Consumptions, lb/tn ore | |
|---|---|---|---|---|---|---|---|
| | | | | | | NaCn | CaO |
| B | 1 | CIL CN⁻ | 0.058 | 9.6 | 0.052 | 5.3 | 2.6 |
| B | 2 | CIL | 0.060 | 7.8 | 0.055 | 6.7 | 1.8 |
| B | 3 | HNO₃/CIL | 0.063 | 92.0 | 0.005 | 5.0 | 1.8 |

These ores would be described as being nearly completely refractory based on gold dissolutions of only approximately 9% without any oxidative pretreatment (tests A1 and B1). Refractoriness due to preg-robbing effects was minimal based on the tests with carbon (CIL). Therefore, the refractory nature of the ores was confirmed as being due to gold associated structurally with the arsenic and iron sulfides. This is a common mineralogic occurrence and is a widespread cause of gold ore refractoriness.

The ores were shown to be amenable to nitric acid oxidative pretreatment. Gold dissolutions increased to as much as 87.2% and 92.0%, respectively, from ores A and B after HNO₃ pretreatment.

Sodium cyanide consumptions were relatively high at 2.2 to over 6 lb/ton of ore, even after nitric acid pretreatment and agitation leaching.

EXAMPLE 2

In preparation for quantitative simulated-heap oxidative leaching tests, small scale column tests in 3.5 or 4 inch diameter glass columns filled with ore to 12 to 14 inches were conducted initially to assure that the ore can be processed and/or crushed to yield satisfactory permeability characteristics. Ore A was crushed to provide two sized samples, a nominal ¼ inch crush and a nominal ¾ inch crush, whereas ore B was crushed only to a nominal ¼ inch crush. Coarser particle sizes, say a nominal 1 inch crush can also be employed in this process.

The procedure involved no pretreatment of the ore in baseline cases before being loaded in the columns. The runs labelled "Acid/Binder Agglomeration" were carried out by treating the ore first with concentrated sulfuric acid in amounts equivalent to 5.5 pounds of 100% sulfuric acid per ton of ore. This pre-acidification step with sulfuric acid neutralized any acid-consuming constituents in the ore and lowered the pH of liquid in contact with the ore to about 1. The ore was then pretreated with 70% by weight nitric acid in amounts equivalent to 85 pounds of HNO₃ acid per ton of ore which is about 50% of the stoichiometric amount theoretically required for complete sulfide sulfur oxidation. The nitric acid was mixed with the ore by being rolled on a blending cloth and also by mixing in a variable speed/pitch balling or pelletizing drum. After nitric acid addition was complete, an acid resistant binder, Cellulonp ™ fiber, a reticulated bacterial cellulose fiber, was diluted with water to form a 0.5 weight percent suspension and was uniformly sprayed onto the acidified, nitric acid treated ore in amounts equivalent to 0.64 pound of fiber per ton of ore. The thus-treated ore after being allowed some residence time to cure was then placed in the test columns.

In the case of the "Acid Agglomeration" tests, the same procedure as reported above was used except that no binder was added to the ore after nitric acid pretreatment. It was observed that the nitric acid alone had an agglomerating effect on the wet fines in the ore and tended to hold the fines together in discrete agglomerated particles, even without the use of an added binder, although the binder greatly enhanced the agglomerating effect of the acid. In all cases, the total liquid content of the treated ore samples was about 11% to 12% by weight Test results were:

| Test | Sample B ¼ inch QMP | | | Sample A ¼ inch QTZ | | | Sample A ⅜ inch QTZ |
|---|---|---|---|---|---|---|---|
| | Baseline | Acid/Binder Agglo. | Acid Agglo. | Baseline | Acid/Binder Agglo. | Acid Agglo. | |
| Feed flow accepted, gpm/ft² | — | 0.007–0.018 | — | 0.010–0.016 | 0.015 | 0.022 | |
| Upper flow limit exceeded? | Yes | No | Yes | No | No | No | |
| ¹⁾Pooling/Plugging? | Yes | No | Yes | No | No | No | |
| Final effluent flow, gpm/ft² | <0.001 | 0.018 | 0.002 | 0.016 | 0.015 | 0.022 | |
| At time, hours | 4 hrs | 28 hrs | 5 hrs | 48 hrs | 27 hrs | 48 hrs | |
| ²⁾Total Slumpage, % of initial column height | 25 | <5 | 25 | 22 | 13 | 13.2 | |

1) Column plugged and liquid formed pool on top of column
2) Percent decrease (slump) in height of column All of the samples, except for the sample B, baseline and ¼ inch crush, accepted solution flow at relatively high unit area rates without the use of a binding agent to aid agglomeration of fine grained and decrepitated particles. Sample A ¼ inch crush did not contain sufficient fines, as did Sample B ¼ inch crush, to plug even the baseline column. Sample B ¼ inch crush then was agglomerated by adding a Cellulon ™ binding agent and agglomerating as described above after the nitric acid agglomeration step. This procedure resulted in good agglomerate formation, and the column accepted solution flow at flow rate as high as 0.018 gpm/ft² of column cross-sectional area.

The above tests were repeated with the binders set forth below to determine permeability of the resulting ore beds. The table below lists the crush size, binding agents and final flow rates achieved through the bed. The binding agent was applied at the equivalent of 0.4 lb per ton of ore.

| Ore Crush Size | Binding Agent | Plugging | Final Flow Rate gpm/ft$^2$ |
|---|---|---|---|
| ¼" | Cellulon TM | No | 0.016 |
| ¼" | Avicel TM | No | 0.016 |
| ¼" | Nalco TM | No | 0.016 |
| ⅜" | Cellulon TM | No | 0.016 |
| ⅜" | None | No | 0.022 |

EXAMPLE 3

A simulated heap oxidative leaching test was conducted to evaluate nitric acid oxidation of ore sample A, ¼ inch crush. The test used downflow movement of solution over a bed of ore to simulate heap leaching practice. The bed of ore was prepared in a column 6 inches in diameter and contained a 4 feet high bed of ore, equivalent to approximately 30 kg or ore, as follows:

One 60 kg ore charge was treated initially with $H_2SO_4$ (5 lb/ton of ore) and followed by nitric acid oxidation at a dosage of 87 lb/ton of ore. Binding agent was then added at a dosage of 0.35 lb/ton during an agglomeration stage. These preliminary treatments were carried out in a similar manner to Example 2.

After agglomeration, the sample was split in half, and cured overnight. One half the charge was placed in the column to form the four feet high bed, whereas the other half was used for another test example.

The simulated heap oxidation was begun by feeding nitric acid into the top of the bed using a 20 g $HNO_3/l$ solution at the rate of 0.01 gpm/ft$^2$. The solution strength was increased subsequently to increments of 30, 60, and 120 g $HNO_3/l$ during the test, to determine if this altered rates of oxidation and overall dissolution.

The oxidation was monitored by assaying the column effluents for iron and less frequently for arsenic, these being reliable indicators of the extent of pyrite and arsenopyrite oxidation and, therefore, dissolutions. Effluents were also measured for pH which typically were less than 1, and the emf or redox potential was typically over −700 m.v. and indicated a strong oxidizing environment.

The column was operated for approximately three to four weeks and the following oxidation and leaching results were obtained.

|  | Column 1 |
|---|---|
| Feed Assays, % |  |
| $S^{2-}$ | 1.61 |
| As | 0.66 |
| Fe | 3.21 |
| Residue Assays, % |  |
| $S^{2-}$ | 0.21 |
| As | 0.092 |
| Fe | 1.12 |
| Overall Oxidation/Dissolution, % |  |
| $S^{2-}$ | 87.0 |
| As | 86.1 |
| Fe | 65.1 |

Sulfide sulfur oxidation was as high as 87.0%, whereas arsenic oxidation and dissolution was as much as 86.1%. Iron dissolution was approximately 65% to 66%; however, the undissolved portion was due in major part to the insolubility of iron oxide minerals which represented a significant amount of the total iron content of the ore. Based on the $S^{2-}$ results, iron associated with pyrite and arsenopyrite can be assumed to have been dissolved in amounts comparable to those for sulfide sulfur.

EXAMPLE 4

The column oxidation residues from the above Example 3 were percolated with water to remove residual soluble sulfates and nitric acid until the effluent pH was at least 3.5. The residue then was rinsed by passing a saturated lime-water solution through the bed to neutralize any traces of remaining acid and prepare an alkaline environment for the subsequent cyanidation step. The lime solution was percolated until the effluent pH was maintained at approximately 11.5.

Total washing/neutralization time was approximately two weeks. Lime (CaO) consumptions were approximately 2.1 lb/ton of ore. The relatively low lime consumptions indicated that there was no significant production of gypsum in the ore bed, thus assuring good permeability in the column.

EXAMPLE 5

The neutralized residues from the above Example 4 residues were percolated with a dilute (1.0g/l) aqueous sodium cyanide solution that was adjusted to pH 11.5 with lime. Percolation was continued for approximately three weeks at the rate of approximately 0.005 gpm/ft$^2$. When assays of column effluents indicated that gold dissolutions had leveled off, the residues were percolation rinsed with water to remove unreacted cyanide. Column residues were discharged, dried, and prepared for assays and other characterization tests.

Gold dissolutions, on a normalized head assay basis, were as high as 79.4%. Based on test calculated head assays (i.e., gold accountability in all of the various test products), gold recoveries were 78.5%. The overall test accountabilities of gold were good and reflected normal analytical and experimental variations.

Sodium cyanide consumption was a reasonable 1.7 lb/ton of ore. The relatively low consumption reflected the benefits of effective leaching and rinsing of sulfides and other cyanacides during the prior nitric acid oxidation step.

EXAMPLE 6

Optical examination of the cyanidation leach residue of Example 5 provided lucid evidence to substantiate the chemical assay data.

The source of the small amount of unrecovered gold was determined. No visible gold or free sulfides were detected; therefore, most of the unleached gold was believed to be associated structurally with the euhedral pyrite and arsenopyrite that occurred in fragments of dense impervious vein quartz. These sulfides varied from those completely intact to heavily corroded, to mere relics. The vein quartz fragments amounted to only 5% to 10% in the coarser fractions, and diminished with finer particle sizes. The dense vein quartz would not be expected to be permeable to oxidants or acids.

Microscopic examination also revealed abundant cavities in the more permeable quartzite fragments that were formerly occupied by euhedral pyrite and arsenopyrite. No free sulfides or partially exposed sulfides were observed, and this confirmed the chemical assays that essentially complete sulfide oxidation and leaching had occurred during simulated heap leaching. It was concluded that the preponderance of muscovite mica in the ore, and the absence of authigenic quartz, provided good microscopic capillary channels and, therefore, contributed the good solution diffusion properties which are vital to successful heap oxidation and leaching.

EXAMPLE 7

Samples of the ore feeds and column residues from the above Example 5 were measured for porosity, surface area, and specific gravity to further demonstrate the effects of chemical oxidation. Results were:

| Sample | Porosity, %[1] | Specific Gravity | Surface Area cm²/g |
|---|---|---|---|
| Ore Feed | 14.3 | 2.78 | 613.5 |
| Column 1 Residue | 19.0 | 2.71 | 677.8 |

[1] pore volume of solid particles only.

The increases in surface areas and porosities of the residues reflected the cavities that were exposed by disintegration of sulfide minerals during solution diffusion through the quartzite fragments. The decrease in specific gravities reflected the disintegration and subsequent leaching and rinsing of the higher specific gravity sulfide particles.

EXAMPLE 8

To further demonstrate the effectiveness of chemical oxidation, the above tests in Example 5 were repeated; however, thiourea was used as the gold lixiviate in place of sodium cyanide. In this case, the neutralization step was omitted since the thiourea normally is used in an acidic environment. Thiourea lixiviate conditions were as follows.

| Thiourea: | 1.5 g/l |
|---|---|
| $Fe_2(SO_4)_3$: | 1.0 g/l |
| $H_2SO_4$: | to pH 1.5 |
| Flow rate: | 0.005 gpm/ft² |

Leaching results were:

| Feed Assays, Au, oz/ton | 0.068 |
|---|---|
| Residue Assays, Au, oz/ton | 0.022 |
| Gold Dissolutions, % | 67.6 |

Although the gold recoveries were not quite as substantial as with cyanide, they again represented large improvements over those obtained without oxidation. Thiourea would be a useful lixiviate in some cases where the ore mineralogy is such that acidic gold leaching would be beneficial.

EXAMPLE 9

The above oxidation/cyanidation test procedures of Example 5 were repeated on sample A to demonstrate the effectiveness of the process on ore feed that was crushed to a nominal ⅜ inch size, in contrast to the prior ¼ inch tests. No binding agent was used with the ⅜ inch ore, since, due to the coarser ore size, permeability tests showed that no pluggage or pooling occurred. In this example, the $HNO_3$ percolation solution was operated downflow and the concentration was increased to 120 g/l from 60 g/l used typically in the ¼ inch tests. Metallurgical results from the ⅜ inch column test were:

| | $S^{2-}$ | Fe | As | Au |
|---|---|---|---|---|
| Head Assays, % | 1.61 | 3.21 | 0.66 | 0.068 |
| Residue Assays, % | 0.34 | 1.33 | 0.099 | 0.012 |
| Dissolutions, % | 78.9 | 58.6 | 85.0 | 82.3 |

The gold recovery of 82.3% was comparable to those obtained in the prior examples with ¼ inch ore. Sulfur, iron, and arsenic dissolutions were also as good as those of prior tests.

Gold dissolution rates were extremely rapid, with as much as approximately 60% to 70% of the gold being solubilized in the first day of cyanide leaching.

Sodium cyanide consumption was approximately 1 lb/ton of ore based on the total leaching time. However, the consumption was less than 1 lb/ton during the first week of leaching when gold leaching was essentially levelled off.

No permeability problems were encountered, and the average flow rate during cyanidation was maintained at the desired 0.005 gpm/ft² rate.

EXAMPLE 10

A separate agglomeration and column test on sample A ¼ inch ore was carried out similar to that of Example 3 to determine the deportment of $HNO_3$ in the liquid effluent and vapor phase from the agglomeration and heap oxidation (percolation) steps. The vapor phases were analyzed with a $NO_x$ monitor for direct measurement of gas volume and composition. The gas phase also was scrubbed with NaOH to allow analysis of $NO_3$. A total of 156% of the stoichiometric $HNO_3$ requirement was added in the test. The resultant distributions of $HNO_3$ were as follows.

| Product | $HNO_3$, % of Stoichiometric | $HNO_3$, % of Total Added |
|---|---|---|
| Total $HNO_3$ added | 156.2 | 100.0 |
| Agglomerator off-gas ($NO_x$) | 25.0 | 16.0 |
| Column off-gas ($NO_x$) | 3.5 | 2.2 |
| Effluent | 97.0 | 62.0 |
| Total $HNO_3$ accounted for | 126.0 | 80.2 |
| Unaccounted $HNO_3$ | 30.2 | 19.8 |

Theoretically, since no $HNO_3$ is consumed in the oxidation of sulfides, the unaccounted $HNO_3$ amount of 19.8% (% of total added basis) was believed to be present as soluble NO. Thus, it would be necessary to strip or simultaneously convert NO to $NO_2$. All of the $NO_x$ in the vapor phases can be regenerated to nitric acid and recycled to the oxidation steps; whereas, the $HNO_3$ in the aqueous phase can be selectively removed from the stream by ion exchange or electrodialysis, and be recirculated to the heap percolation step.

EXAMPLE 11

After removal of most of the nitric acid from the column acid effluent in Example 3, the liquid was neutralized with milk-of-lime to precipitate arsenic as stable calcium and ferric arsenates. Gypsum also is formed due to the neutralization of ferric sulfate and any residual sulfuric acid in the effluent.

Tests were conducted with neutralization to pH 4.5 and 11.5. The solids were separated by filtration and subjected to TCLP tests which measure the degree of stability of toxic components of a sample. The TCLP test refers to "Toxicity Characteristic Leaching Procedure" and determines the hazardous/non-hazardous classification of a material in accordance with U.S.E.P.A. protocols published in the current edition of the Federal Register. The results showed that the TCLP extractants contained less than 0.1 mg arsenic/l, which is well below the maximum EPA regulatory level of 5 mg/l. Therefore, the precipitate could be disposed of in a stable, i.e., potentially non-hazardous, form.

EXAMPLE 12

Several column tests were conducted similar to Example 5 on the ¼ inch sample A to demonstrate the effects on oxidation and gold recoveries by varying the proportion of nitric acid addition in the initial or preliminary oxidation step. Additions were varied from 25% to 75% of the stoichiometric $HNO_3$ requirement.

Test results were:

| Test No. | $HNO_3$ % of Stoichiometric | Dissolutions, %[1] | | | |
|---|---|---|---|---|---|
| | | Au | $S^{2-}$ | Fe | As |
| 6 | 25 | 65.0 | 70 | 52 | 72 |
| 8 | 50 | 69.6 | 66 | 51 | 76 |
| 9 | 75 | 63.8 | 74 | 55 | 76 |

[1] Dissolutions are based on the test calculated head assays.

There did not appear to be any major extraction differences that could be ascribed to the amount of $HNO_3$ added in the preliminary oxidation step. This conclusion reflects the results achieved after typically three or four weeks of percolation oxidation.

EXAMPLE 13

Additional downflow column tests carried out as in Example 5 demonstrated that the $HNO_3$ concentration of the percolation solution during simulated heap oxidation was an important factor in controlling the rates of oxidation and overall dissolutions, as shown by the data below. All tests used $HNO_3$ addition in the preliminary $HNO_3$ oxidation step of 50% of the stoichiometric amount.

| Test No. | $HNO_3$ Conc. in Heap Oxidation g $HNO_3$/l | Dissolutions, % | | | |
|---|---|---|---|---|---|
| | | Au | $S^{2-}$ | Fe | As |
| 8 | 60 | 69.6 | 66 | 51 | 76 |
| 10 | 120 | 72.0 | 91 | 63 | 88 |
| 11 | 200 | 80.8 | 93 | 68 | 84 |

These results show improved gold recovery with increased nitric acid concentrations during heap oxidation.

EXAMPLE 14

To determine if any gold was solubilized during the $HNO_3$ oxidation, samples of column acid effluent were evaporated from test runs in Examples 12 and 13 and the resultant solids were fire assayed to measure the ore basis equivalent gold contents. This method was chosen over atomic absorption to increase the analytical sensitivity. Results were:

| Test No. | Au Dissolutions, % |
|---|---|
| 6 | <0.3 |
| 8 | 0.6 |
| 9 | 3.1 |
| 10 | 2.9 |

Gold dissolutions greater than approximately 2 percentage points resulted in the tests that used the most severe oxidation conditions of $HNO_3$ concentration and time. In contrast, lower gold solubilities occurred with the least severe conditions; i.e., at lower $HNO_3$ additions to the preliminary oxidation stage, i.e., Test 6, and when the oxidation time and, therefore, solution throughput was lowest, i.e., Test 8.

EXAMPLE 15

A hydrogen ion speciation analysis was performed on a composite effluent sample from the above Example 3 sample A column tests. Results were:

| Species | Assay Unit | Assay Column 1 |
|---|---|---|
| Calculated Values: | | |
| $Fe_2(SO_4)_3$ | g/l | 13.1 |
| $Fe(NO_3)_3$ | g/l | 1.9 |
| $H_2SO_4$ | g/l | 0.0 |
| $HNO_3$ | g/l | 37.1 |
| $HAsO_3$ | g/l | 5.4 |
| Total $H^+$ | g/l | 0.63 |
| | % as $HNO_3$ | 92.9 |
| | % as $H_2SO_4$ | 0.0 |
| | % as $HAsO_3$ | 6.9 |
| $H^+$ accountability, %: (Calculated value/Composite assay value) | | 105 |

Nitric acid represented approximately 95% of the total hydrogen ion content or acidity of the column oxidation effluent. The balance was comprised primarily of arsenic acid ($HAsO_3$). Free sulfuric acid was negligible.

It was likely that a significant amount of the reported $HNO_3$ content is represented by soluble NO. This nitrogen species is a major product of the reaction between $HNO_3$ and sulfur, and NO would be expected to remain in solution due to its relatively high solubility in $HNO_3$.

EXAMPLE 16

The response to nitric acid heap oxidation of a high sulfide refractory ore, sample C, was evaluated in baseline and column tests.

Head assays of the sample were:

| | |
|---|---|
| Au, oz/ton: | 0.073 |
| Ag, oz/ton: | 0.88 |
| $S_T$, (Total sulfur, including $SO_4$) %: | 10.9 |
| $SO_4$, %: | 1.75 |
| $S^{2-}$, %: | 10.3 |
| Fe, %: | 9.72 |
| As, %: | 0.033 |
| $C_T$, %: | 0.25 |
| $CO_2$, %: | 0.04 |
| $C_{(free)}$, %: | 0.24 |

The total sulfur content of this ore was 10.9%, or times the amount in the previous ore sample A. Silver content at 0.88 oz/ton, was significant from metallurgical and commercial standpoints. The ore contains a small amount of free (organic) carbon and has a small preg-robbing ability.

Baseline agitation leaching tests carried out similar to Example 1 verified the substantially refractory nature of the ore, with gold recoveries of approximately 30 to 36%. Due to the high sulfur content, sodium cyanide consumptions were as high as 22 to 27 lb/ton ore, and CaO consumptions were 13 lb/ton. This sample was amenable to nitric acid oxidation, based on the following data.

| Oxidation Residue Assays | | Dissolutions, % |
|---|---|---|
| Au, oz/ton | 0.079 | — |
| Ag, oz/ton | 0.65 | — |
| Fe, % | 0.103 | 99.3 |
| As, % | 0.0039 | 90.5 |
| $S_T$, % | 2.14 | 85.0 |
| $SO_4$, % | 0.37 | — |
| $S^{2-}$, % | 2.02 | 86.0 |

Weight loss of the ore was approximately 26%, which amount is consistent with the amount of pyrite ($FeS_2$) that was leached from the ore.

Cyanidation (CIL) of the nitric acid residue dissolved as much as 87.6% of the gold, which amount again represented a considerable improvement over that obtained without oxidation. Sodium cyanide consumption decreased markedly to 4.9 lb/ton of ore, and lime decreased to 2.7 lb/ton of ore. These reductions reflected the oxidation, dissolution, and rinsing of sulfide minerals which act as cyanicides.

EXAMPLE 17

Duplicate downflow (simulated-heap) column oxidation leaching tests were performed on Sample C using similar conditions established for prior Example 3. Iron oxidation was rapid and after approximately three weeks, iron dissolutions were as high as approximately 77%. Total $HNO_3$ addition was only 1.7 times the stoichiometric requirement. Gold recoveries were 79% and 82% based on bottle cyanidation tests performed on the duplicate column residues. Bottle cyanidation tests are performed by mixing a sample with an aqueous cyanide solution in a bottle for about 48 hours. This maximizes gold dissolution under near equilibrium conditions and yields a rapid means of analysis.

EXAMPLE 18

Tests were performed on Sample D, a mixed oxidized-sulfide ore. Head assays are:

| Au, oz/ton | 0.096 |
|---|---|
| Ag, oz/ton | 0.17 |
| Fe, % | 4.38 |
| As, % | 0.21 |
| $S_T$, % | 0.44 |
| $SO_4$, % | 0.20 |
| $S^{2-}$, % | 0.38 |

The relatively low sulfide and high iron contents of this sample reflect the oxidation, geologically, of iron sulfides to iron oxides. Therefore, it would be necessary to oxidize only the remaining small amount of iron and arsenical iron sulfides. The CIL runs were conducted as in Example 1 to establish a baseline. The $HNO_3$+CIL runs were also conducted as described in Example 1 to determine the ore's degree of refractoriness and the effectiveness of nitric acid pre-leaching.

Baseline leaching tests were:

| | CIL | $HNO_3$ + CIL |
|---|---|---|
| Residue Assays | | |
| Fe, % | —[1] | 3.86 |
| As, % | —[1] | 0.097 |
| $S^{2-}$, % | —[1] | 0.055 |
| Au | 0.043 | 0.008 |
| Dissolutions, % | | |
| Fe | —[1] | 24.5 |
| As | —[1] | 67.0 |
| $S^{2-}$ | —[1] | 85.4 |
| Au | 56.0 | 82.5 |

[1]/No significant solubilities of these elements occur in CIL.

As much as 85.4% of the total sulfide content was oxidized. On this basis, the dissolution of iron and arsenic would represent near complete conversion of the sulfide constituents of these components. Gold recovery increased from 56% to 82.5% after nitric acid oxidation. The higher CIL dissolution of gold reflected the partially oxidized geologic nature of the sample; therefore, the ore would be described as being only partly refractory.

Sample D was subjected to column oxidation and leaching using the same conditions as for the cited prior Example 3. Iron effluent assays showed that, after only two or three days of oxidation percolation, iron dissolutions had levelled off. Arsenic dissolution was 47%. Gold dissolution was approximately 79% based on bottle cyanidation tests performed on the calcium residues.

EXAMPLE 19

To further demonstrate the effectiveness of nitric acid oxidation, confirming tests were performed on ore Sample E. This ore is characterized by a high carbonaceous matter content, which carbonaceous material normally causes refractoriness due to strong preg-robbing effects Head assays of the sample are:

| Ag, oz/ton | <0.01 |
|---|---|
| $S_T$, % | 1.01 |
| $SO_4$, % | 0.25 |
| $S^{2-}$, % | 0.93 |
| Fe, % | 2.31 |
| As, % | — |
| $C_T$, % | 3.59 |
| $CO_2$, % | 11.3 |
| $C_{organic}$, % | 0.51 |

Baseline agitation leaching tests performed similar to Example 1 showed that the ore has a large preg-robbing ability, but responded well to nitric acid oxidation, as follows:

| | NaCN Test | CIL Test | $HNO_3$ + CIL Test |
|---|---|---|---|
| Au Dissolutions, % | 8.0 | 49.0 | 92.0 |
| Residue Assays, oz Au/ton | 0.179 | 0.100 | 0.026 |
| Head Assays, oz Au/ton | 0.194 | 0.196 | 0.262 |
| NaCN, lb/ton ore | 4.6 | 7.1 | 7.2 |
| CaO, lb/ton ore | 0.8 | 0.8 | 1.5 |

Column testing performed similar to Example 5 showed that as much as approximately 92.1% of the iron was dissolved in the oxidation step, after only 12 days, and more than 80% of the gold was recovered in the column cyanidation step after only 8 days. Sodium cyanide consumption was a reasonable 1.8 lb/per ton of ore.

These results confirmed that the preg-robbing ability of the ore was diminished substantially, and that the organic carbon in the ore was effectively deactivated or passivated during nitric acid oxidation. Had the carbonaceous matter not been passivated, much of the gold solubilized during cyanidation would have been re-adsorbed immediately as the lixiviant percolated through the ore.

EXAMPLE 20

To determine the effects of different nitric acid dosages on the extent and rate of sulfide oxidation during only the preliminary oxidations step, tests were performed in which small samples of solids residue from the preliminary oxidation with $HNO_3$, performed as in Example 3, were taken at timed intervals and were water washed and assayed for key elements. Bottle cyanidation tests also were performed on the residues to relate gold solubilities with varying degrees of oxidation. Results were:

| Preliminary Time, Hours | Cumulative Oxidation, % | | | | | | | |
|---|---|---|---|---|---|---|---|---|
| | 50% Stoichiometric $HNO_3$ | | | | 100% Stoichiometric $HNO_3$ | | | |
| | Fe | As | $S_T$ | $S^{2-}$ | Fe | As | $S_T$ | $S^{2-}$ |
| 1.3 | 24 | 27 | 30 | 33 | 36 | 33 | 50 | 54 |
| 2.3 | 26 | 15 | 39 | 42 | 39 | 33 | 50 | 53 |
| 3.5 | 29 | 17 | 46 | 50 | — | — | — | — |
| 6.7 | — | — | — | 50 | 41 | 30 | 53 | 57 |
| 23 | 36 | 30 | 46 | 50 | 44 | 30 | 59 | 65 |

The oxidation rates were significantly higher with the 100% of stoichiometric $HNO_3$ addition and oxidation leveled off after just over one hour. The substantial rate of oxidation was especially impressive considering the coarse heap leach ore size of minus ¼-inch. Overall sulfide oxidation was as much as 50% and approximately 65% when using 50% and 100% stoichiometric $HNO_3$ additions, respectively. This substantiates the practicality of using a preliminary oxidation stage with equipment such as rotary kilns or equivalents thereof which are ideal for agglomerating and for easily containing the $NO_x$ gas that is given off at these high oxidation rates.

Gold dissolution data obtained by bottle dissolution tests were:

| Preliminary Oxidation Time, Hours | Gold Dissolutions, % | |
|---|---|---|
| | 50% Stoichiometric $HNO_3$ | 100% Stoichiometric $HNO_3$ |
| 1.3 | 25.2 | 38 |
| 2.3 | 33.3 | 42 |
| 3.5 | 37.7 | 44 |
| 23 | 38.3 | 46 |

Gold dissolutions were significantly higher for the tests using 100% stoichiometric $HNO_3$ addition, and the dissolution rates paralleled the increasing sulfide oxidation rates.

EXAMPLE 21

To determine whether the prospect of achieving essentially complete oxidation in the preliminary oxidation step, (i.e., Example 20, above) was controlled by solution diffusion properties of the ore particles or whether there was a chemical limitation or depletion, a preliminary oxidation test was conducted wherein 50% of the stoichiometric $HNO_3$ was added and mixed for approximately three hours. Leach assays and sulfur oxidation data were determined during the three hours. Thereafter, the residue was washed thoroughly with water, partially dried to about 4% moisture, and then re-mixed with another 50% of the total $HNO_3$ addition. Leach assays and sulfur oxidation data were determined after the second stage mixing from 0.5 to 19.5 hours.

Sulfur oxidation data are reported in Table I.

The second stage sulfur oxidation increased from 62% to 77% after 19.5 hours of curing. Although the final oxidation supported the rapid rates observed in the prior preliminary oxidation tests, the relatively small increase in the second stage indicated that the oxidation or leaching rate was largely diffusion controlled; i.e., dependent on the rate of solution mobility through the ore fragments. Thus, the element of time was important to ensure that more complete sulfur oxidation; i.e., approximately 85%–88% for this ore sample, would be achieved.

In bottle cyanidation tests, gold recovery from cyanidation of the 19.5 hour residue was approximately 75%, which is consistent with the sulfide oxidation of 77%.

TABLE I

| Oxidation Time, Hours | Leach Residue Assays, % $S_T$[1] | | Cumulative Sulfur Oxidation, % | |
|---|---|---|---|---|
| | 1st Stage | 2nd Stage | 1st Stage 50% Stoichiometric $HNO_3$ | 2nd Stage 50% Stoichiometric $HNO_3$ |
| 0.5 | 1.33 | 0.694 | 27 | 62 |
| 1.0 | 0.948 | 0.641 | 48 | 65 |
| 2.0 | 0.641 | 0.548 | 65 | 70 |
| 3.0 | 0.717 | 0.655 | 61 | 64 |
| 19.5 | — | 0.416 | — | 77 |

[1]Feed sample $S_T$ assay = 1.72%

We claim:

1. A hydrometallurgical process for recovery of precious metals from an ore which is refractory to treatment by lixiviating agents comprising:
   a. crushing the ore to no finer than about a nominal ¼ inch size,
   b. treating the crushed ore with a mineral acid in amounts to being the resulting mixture of a pH of about 2 or below,
   c. treating the acidified ore with from about 5% to about 200% of the stoichiometric amount of nitric acid required to react with the ore, and recovering any $NO_x$ gas evolved from the ore, d. placing the thus-treated ore in a heap permeable ore bed on top of an impermeable collector,
e. heap treating the permeable ore bed by dispersing continuously or intermittently an aqueous nitric acid solution through the bed,
f. separating residual acid liquor from the heap permeable ore bed,
g. water washing the heap permeable ore bed to remove nitric acid solution therefrom, and separating the washings from the ore bed,
h. introducing any $NO_x$ gases recovered from step c. into a nitric acid generator for conversion of the $NO_x$ into nitric acid and recycling said nitric acid for use in treating said ore,
i. treating the heap permeable ore bed by dispersing continuously or intermittently a lixiviate for precious metals through the bed,
j. separating the lixiviate solution containing dissolved precious metals from the heap permeable ore bed and recovering said precious metals from the lixiviate.

2. Process of claim 1 wherein said ore is crushed to a nominal ¼ inch up to a nominal ¾ inch.

3. Process of claim 1 wherein said mineral acid in step b. is sulfuric acid.

4. Process of claim 1 wherein said nitric acid in step c. has a concentration of from about 20% to about 70% by weight $HNO_3$.

5. Process of claim 1 wherein said aqueous nitric acid in step e. has a concentration of from about 6% to about 20% by weight $HNO_3$.

6. Process of claim 1 wherein said calcium, sodium or magnesium ions are supplied by using $Ca(OH)_2$, $CaO$, $CaCO_3$, $NaOH$, or $Mg(OH)_2$.

7. Process of claim 1 wherein said lixiviate is an aqueous solution of sodium cyanide.

8. Process of claim 1 wherein said ore is treated in steps b. through i. at ambient temperatures and under atmospheric pressures.

9. Process of claim 1 wherein said residual acid liquor separated from said heap permeable ore bed in step f. is passed through an ion exchange unit and $HNO_3$ separated from the remaining liquor.

10. Process of claim 9 wherein said separated $HNO_3$ is recycled for use in treating said ore.

11. Process of claim 1 wherein said residual acid liquor separated from said heap permeable ore bed in step f. is passed through a carbon column and soluble precious metal values are selectively adsorbed in the carbon column separate from other metal values in said liquor.

12. A hydrometallurgical process for recovery of precious metals form an ore which is refractory to treatment by lixiviating agents comprising:
    a. crushing the ore to a nominal size of from about ¼ inch to about 1 inch,
    b. treating the crushed ore with sulfuric acid to a pH of about 2 or below,
    c. treating the acidified ore with from about 5% to about 200% of the stoichiometric amount of nitric acid required to react with the ore wherein the nitric acid has a concentration of from about 20 weight percent to about 70 weight percent $HNO_3$, and recovering andy $NO_x$ gas evolved from the ore,
    d. placing the thus-treated ore in a heap permeable ore bed on top of an impermeable collector,
    e. heap treating the permeable ore bed by dispersing continuously or intermittently and aqueous nitric acid solution through the bed having a concentration of about 6 weight percent to about 20 weight $HNO_3$,
    f. separating residual acid liquor from the heap permeable ore bed,
    g. water washing the heap permeable ore bed to remove nitric acid solution therefrom, and separating the washings from the ore bed,
    h. separating nitric acid values from said residual acid liquor of step f. and recycling the nitric acid for use in treating said ore,
    i. introducing any $NO_x$ gases recovered from steps . into a nitric acid generator for conversion of the $NO_x$ into nitric acid and recycling said nitric acid of use in treating said ore,
    j. treating the heap permeable ore bed with sufficient calcium, sodium or magnesium ions under alkaline conditions to increase the pH of the liquor removed from the bed to about 10 or above,
    k. treating the heap permeable ore bed by dispersing continually or intermittently a sodium cyanide lixiviating solution for precious metals through the bed,
    l. separating the lixiviating solution containing dissolved precious metals from the heap permeable ore bed and recovering said precious metals from the lixiviating solution.

13. Process of claim 12 wherein said ore is treated in steps b. through k. at ambient temperatures and atmospheric pressures.

14. Process of claim 12 wherein said residual acid liquor separated from said heap permeable ore bed in step f. is passed through a carbon column and soluble precious metal values are selectively adsorbed in the carbon column separate from other metal values in said liquor.

15. Process of claim 12 wherein nitric acid values are separated from residual acid liquor in step h. by use of an ion exchange unit.

16. Process of claim 12 wherein the nitric acid generator employed for conversion of the recovered $NO_x$ into nitric acid in step i. is an air absorption type generator.

17. Process of claim 1 wherein an acid resistant binder is added to the nitric acid-treated ore from step c. to form ore agglomerates capable of maintaining a porous bed of ore, maintaining the binder and ore in contact with one another for a sufficient curing time to permit the ore agglomerates to maintain their particulate form, and recovering any $NO_x$ evolved from the ore.

18. Process of claim 1 wherein the heap permeable ore bed of step g. is treated with sufficient calcium, sodium or magnesium ions under alkaline conditions to increase the pH of the liquor removed form the bed to about 10 or above.

19. Process of claim 17 wherein any $NO_x$ gases recovered during the formation of the ore agglomerates are sent to a nitric acid generator for conversion of the $NO_x$ into nitric acid and recycling the nitric acid for use in treating said ore.

20. Process of claim 12 wherein an acid resistant binder is added to the nitric acid-treated ore from step c. to form ore agglomerates capable of maintaining a porous bed of ore, maintaining the binder and ore in contact with one another for a sufficient curing time to permit the ore agglomerates to maintain their particulate form, and recovering any $NO_x$ evolved from the ore.

21. Process of claim 20 wherein any $NO_x$ gases recovered during the formation of the ore agglomerates are sent to a nitric acid generator for conversion of the $NO_x$ into nitric acid and recycling the nitric acid for use in treating said ore.

22. A hydrometallurgical process for recovery of precious metals from an ore which is refractory to treatment by lixiviating agents comprising:
 a. crushing the ore to no finer than about a nominal ¼ inch size,
 b. treating the crushed ore with a mineral acid in amounts to bring the resulting mixture to a pH of about 2 or below,
 c. treating the acidified ore with from about 5% to about 200% of the stoichiometric amount of nitric acid required to react with the ore, and recovering any $NO_x$ gas evolved from the ore,
 d. adding an acid resistant binder to the nitric acid-treated ore to form ore agglomerates capable of maintaining a porous bed of ore, maintaining the binder and ore in contact with one another for a sufficient curing time to permit the ore agglomerates to maintain their particulate form, and recovering any $NO_x$ evolved from the ore,
 e. placing the thus-treated ore in a heap permeable ore bed on top of an impermeable collector,
 f. heap treating the permeable ore bed by dispersing continuously or intermittently and aqueous nitric acid solution through the bed,
 g. separating residual acid liquor from the heap permeable ore bed,
 h. water washing the heap permeable ore bed to remove nitric acid solution therefrom, and separating the washings from the ore bed,
 i. introducing any $NO_x$ gases recovered from any of steps c. and d. into a nitric acid generator for conversion of the $NO_x$ into nitric acid recycling said nitric acid for use in treating said ore,
 j. treating the heap permeable ore bed with sufficient calcium, sodium or magnesium ions under alkaline conditions to increase the pH of the liquor removed from the bed to about 10 or above,
 k. treating the heap permeable ore bed by dispersing continuously or intermittently a lixiviate for precious metals through the bed,
 l. separating the lixiviate solution containing dissolved precious metals from the heap permeable ore bed and recovering said precious metals from the lixiviate.

* * * * *

UNITED STATES PATENT AND TRADEMARK OFFICE
CERTIFICATE OF CORRECTION

PATENT NO. : 5,236,492

DATED : August 17, 1993

INVENTOR(S) : Douglas R. Shaw and Larry J. Buter

It is certified that error appears in the above-identified patent and that said Letters Patent is hereby corrected as shown below:

Title page, ABSTRACT, line 2, "of a precious" should read --of precious--. Column 12, line 1, "$H_2SO_4+Ca(PH)_2 \rightarrow CaSO_4 \cdot 2H_2O\downarrow$" should read --$H_2SO_4+Ca(OH)_2 \rightarrow CaSO_4 \cdot 2H_2O\downarrow$--; line 42, "1/2" should read --1/4--. Column 16, line 12, "quartizite" should read --quartzite--; line 58, "pregrobbing" should read --preg-robbing--. Column 17, line 59, "Cellulonp$^{TM}$" should read --Cellulon$^{TM}$--. Column 18, lines 24-26, "Sample A 3/4 inch QTZ" should read --Sample A 3/4 inch QTZ--. Column 21, lines 44-46, "Feed Assays, Au, oz/ton  0.068  Residue Assays, Au, oz/ton  0.022" should read --Feed Assays, Au, oz/ton  0.068  Residue Assays, Au, oz/ton  0.022--.

UNITED STATES PATENT AND TRADEMARK OFFICE
CERTIFICATE OF CORRECTION

PATENT NO. : 5,236,492
DATED : August 17, 1993
INVENTOR(S) : Douglas R. Shaw and Larry J. Buter It is certified that error appears in the above-indentified patent and that said Letters Patent is hereby corrected as shown below:

Column 26, line 38, "effects Head" should read --effects. Head--. Column 28, line 63, "being" should read --bring--. Column 29, line 32, "1" should read --18--; line 54, "form" should read --from--; line 65, "andy" should read --any--. Column 30, line 2, "and" should read --an--; line 14, "steps ." should read --step c.--; line 17, "of" should read --for--; line 56, "form" should read --from--. Column 32, line 4, "and" should read --an--.

Signed and Sealed this

Eighth Day of March, 1994

Attest:

BRUCE LEHMAN

Attesting Officer

Commissioner of Patents and Trademarks